(12) United States Patent
Skinner

(10) Patent No.: US 7,391,718 B2
(45) Date of Patent: *Jun. 24, 2008

(54) SWAPPING A NONOPERATIONAL NETWORKED ELECTRONIC SYSTEM FOR AN OPERATIONAL NETWORKED ELECTRONIC SYSTEM

(75) Inventor: Craig Stuart Skinner, Snohomish, WA (US)

(73) Assignee: Palm, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/231,291

(22) Filed: Dec. 9, 2005

(65) Prior Publication Data

US 2006/0067339 A1    Mar. 30, 2006

Related U.S. Application Data

(63) Continuation of application No. 10/797,774, filed on Mar. 9, 2004, now Pat. No. 6,970,418.

(51) Int. Cl.
G01R 31/08 (2006.01)

(52) U.S. Cl. .......................... 370/216; 370/254; 709/220

(58) Field of Classification Search .................. None
See application file for complete search history.

(56) References Cited

U.S. PATENT DOCUMENTS

| | | | |
|---|---|---|---|
| 5,010,547 A | 4/1991 | Johnson et al. |
| 5,012,219 A | 4/1991 | Henry |
| 5,075,684 A | 12/1991 | DeLuca |
| 5,359,317 A | 10/1994 | Gomez et al. |
| 5,394,140 A | 2/1995 | Wong et al. |
| 5,430,436 A | 7/1995 | Fennell |
| 5,497,464 A | 3/1996 | Yeh |
| 5,612,682 A | 3/1997 | DeLuca et al. |
| 5,650,776 A | 7/1997 | Mitchell et al. |
| 5,705,995 A | 1/1998 | Laflin et al. |
| 5,757,271 A | 5/1998 | Andrews |
| 5,802,275 A | 9/1998 | Blonder |
| 5,878,282 A | 3/1999 | Mital |
| 5,903,852 A | 5/1999 | Schaupp, Jr. et al. |
| 5,958,006 A | 9/1999 | Eggleston et al. |
| 6,064,666 A | 5/2000 | Willner et al. |
| 6,141,690 A | 10/2000 | Weiman |
| 6,157,630 A | 12/2000 | Adler et al. |
| 6,259,405 B1 | 7/2001 | Stewart et al. |
| 6,300,863 B1 | 10/2001 | Cotichini et al. |
| 6,333,684 B1 | 12/2001 | Kang |
| 6,362,736 B1 | 3/2002 | Gehlot |

(Continued)

OTHER PUBLICATIONS

U.S. Appl. No. 09/884,806 filed Jun. 18, 2001, Skinner et al.

(Continued)

*Primary Examiner*—Duc Ho
(74) *Attorney, Agent, or Firm*—Foley & Lardner LLP

(57) ABSTRACT

A method of switching a network access configuration associated with a first electronic system to a second electronic system via a network is described. The first electronic system is inoperable. The second electronic system replaces the first electronic system such that a user seamlessly transitions from the first electronic system to the second electronic system. The user continues to access the network resources using the second electronic system rather than the first electronic system.

21 Claims, 9 Drawing Sheets

U.S. PATENT DOCUMENTS

| | | | |
|---|---|---|---|
| 6,434,627 B1 * | 8/2002 | Millet et al. | 709/245 |
| 6,539,431 B1 | 3/2003 | Sitaraman et al. | |
| 6,542,729 B1 | 4/2003 | Chmaytelli et al. | |
| 6,553,037 B1 | 4/2003 | Pivowar et al. | |
| 6,609,197 B1 | 8/2003 | Ketcham et al. | |
| 6,804,699 B1 | 10/2004 | Henrie | |
| 7,117,374 B2 | 10/2006 | Hill et al. | |
| 2002/0032042 A1 | 3/2002 | Poplawsky et al. | |
| 2002/0065905 A1 | 5/2002 | Kliland et al. | |
| 2002/0078248 A1 | 6/2002 | Janik et al. | |
| 2002/0081995 A1 | 6/2002 | Leppinen et al. | |
| 2002/0083432 A1 | 6/2002 | Souissi et al. | |
| 2002/0104080 A1 | 8/2002 | Woodard et al. | |

OTHER PUBLICATIONS

U.S. Appl. No. 11/712,228 filed Feb. 28, 2007, Skinner et al.

Amendments and Responses to Office Action mailed Apr. 10, 2006, for U.S. Appl. No. 09/884,806 entitled "Method and Apparatus for Automated Personality Transfer for a Wireless Enabled Handheld Device", filed Jun. 18, 2001, by Skinner et al. (22 pgs.).

Preliminary Amendment Under 37 CFR 1.115 for U.S. Appl. No. 11/712,228 entitled "Method and Apparatus for Automated Personality Transfer for a Wireless Enabled Handheld", filed Feb. 28, 2007, by Skinner et al. (8 pgs.).

* cited by examiner

SWAPPING A NONOPERATIONAL NETWORKED ELECTRONIC SYSTEM FOR AN OPERATIONAL NETWORKED ELECTRONIC SYSTEM

RELATED U.S. APPLICATIONS

This application is a continuation of and claims priority to U.S. Pat. No. 10/797,774 entitled "Swapping A Nonoperational Networked Electronic System For An Operational Networked Electronic System," by Skinner filed on Mar. 9, 2004, now U.S. Pat. No. 6,970,418 which is incorporated herein by reference.

This patent application claims the benefit of U.S. Provisional Application No. 60/201,244, filed on May 1, 2000, entitled "SWAPPING A NONOPERATIONAL NETWORKED ELECTRONIC SYSTEM FOR AN OPERATIONAL NETWORKED ELECTRONIC SYSTEM," by Craig Stuart Skinner.

BACKGROUND OF THE INVENTION

1. Field of the Invention

The present invention generally relates to the field of networked electronic systems. More particularly, the present invention relates to the field of replacing a nonoperational networked electronic system with an operational networked electronic system via a network.

2. Related Art

Computers and other electronic systems or devices (e.g., personal digital assistants) have become integral tools used in a wide variety of different applications, such as in finance and commercial transactions, computer-aided design and manufacturing, health care, telecommunication, education, etc. Computers along with other electronic devices are finding new applications as a result of advances in hardware technology and rapid development in software technology. Furthermore, the functionality of a computer system or other type of electronic system or device is dramatically enhanced by coupling these stand-alone devices together in order to form a networking environment. Within a networking environment, users may readily exchange files, share information stored on a common database, pool resources, and communicate via electronic mail (e-mail) and via video teleconferencing. Furthermore, computers or other types of electronic devices which are coupled to the Internet provide their users access to data and information from all over the world.

The functionality of an electronic system (e.g., a handheld computer system, a desktop computer system, a cellular phone, a pager, etc.) is enhanced by including one or more communication ports for exchanging or sharing data (e.g., via a wireless connection or via a wired connection) with other electronic systems or with a network (e.g., a wireless network, a wired network, etc.). For example, a radio frequency (RF) communication port, an infrared (IR) communication port, or other type of communication port can be incorporated into the electronic system. A communication port is positioned in the electronic system according to a variety of factors, such as space requirements, industry standards, and convenience to a user.

A personal digital assistant (commonly referred to as a PDA) is a handheld computer system. It is appreciated that the personal digital assistant is a portable handheld device that is used as an electronic organizer which has the capability to store a wide range of information that includes daily appointments, numerous telephone numbers of business and personal acquaintances, and various other information. Moreover, the personal digital assistant can also access information from the Internet, as mentioned above. In particular, the personal digital assistant can browse Web pages located on the Internet. Typically, the personal digital assistant includes an electronic display device having a display area (e.g., a screen) that is smaller in size relative to a display area associated with a standard-sized electronic display device (e.g., 15 inch monitor, 17 inch monitor, etc.) which is part of a desktop computer system or a laptop computer system.

Typically, the personal digital assistant includes a communication port (e.g., an IR communication port, a radio frequency (RF) communication port, a serial communication port for coupling to a communication cable, etc.) or other wireless connection. For example, a RF communication port enables the personal digital assistant to couple to a wireless network. Once the personal digital assistant is coupled to the wireless network, a network access configuration is created for the personal digital assistant. The network access configuration enables a user to use the personal digital assistant to access the network resources. Unfortunately, if the personal digital assistant is no longer operational, the user is required to obtain a new personal digital assistant, requiring creation of a new network access configuration for the new personal digital assistant. Creation of the new network access configuration is an inconvenient process performed by the network infrastructure provider and by the network service provider. Moreover, the user is inconvenienced by creation of the new network access configuration since the user cannot access the network until the new network access configuration is created.

SUMMARY OF THE INVENTION

A method of switching a network access configuration associated with a first electronic system to a second electronic system via a network is described. The first electronic system is inoperable. The second electronic system replaces the first electronic system such that a user seamlessly transitions from the first electronic system to the second electronic system. The user continues to access the network resources using the second electronic system rather than the first electronic system. In an embodiment of the present invention, the network comprises a Mobitex wireless network. In an embodiment of the present invention, the network access configuration includes a network identifier. In a Mobitex network, the network identifier comprises a Mobitex access number.

According to an embodiment of the present invention, an application for switching the network access configuration is invoked using the second electronic system. During a first phase, the application transmits first data to a network infrastructure provider. The network infrastructure provider obtains approval for switching the network access configuration from the network service provider. If the network service provider approves switching the network access configuration, the network infrastructure provider updates its databases such that the network access configuration of the first electronic system is associated with the second electronic system. During a second phase, the network service provider updates its databases such that the network access configuration of the first electronic system is associated with the second electronic system if the network infrastructure provider successfully updates its databases. At the conclusion of the second phase, the second electronic system can access the network using the network access configuration. However, the first electronic system is denied access to the network if the first electronic system attempts to access the network using the network access configuration.

These and other advantages of the present invention will no doubt become apparent to those of ordinary skill in the art after having read the following detailed description of the preferred embodiments which are illustrated in the drawing figures.

In one embodiment, the present invention includes a method of switching a network access configuration associated with a first electronic system (FES) to a second electronic system (SES), comprising the steps of: a) transmitting via a network to a network infrastructure provider (NIP) first data for requesting a re-association of the network access configuration to the SES, wherein the network access configuration includes a network identifier for accessing the network; b) requesting approval of the re-association from a network service provider (NSP); c) if the NSP approves the re-association, updating second data for controlling and managing access to the network such that the SES is able to access the network using the network access configuration and the FES is denied access to the network; d) transmitting to the SES the network identifier; and e) if the NIP successfully updates the second data, updating third data for authorizing and tracking usage of the network such that the SES is able to access the network using the network access configuration and the FES is denied access to the network.

In another embodiment, the present invention includes an electronic system comprising: a processor coupled to a bus; an electronic display device coupled to the bus; a communication port coupled to the bus; and a memory device coupled to the bus and having computer-executable instructions for performing a method of switching a network access configuration associated with another electronic system to the electronic system (ES), the method comprising the steps of: a) transmitting via a network to a network infrastructure provider (NIP) first data for requesting a re-association of the network access configuration to the ES, wherein the network access configuration includes a network identifier for accessing the network; b) requesting approval of the re-association from a network service provider (NSP); c) if the NSP approves the re-association, updating second data for controlling and managing access to the network such that the ES is able to access the network using the network access configuration and the another electronic system is denied access to the network; d) transmitting to the ES the network identifier; and e) if the NIP successfully updates the second data, updating third data for authorizing and tracking usage of the network such that the ES is able to access the network using the network access configuration and the another electronic system is denied access to the network.

BRIEF DESCRIPTION OF THE DRAWINGS

The accompanying drawings, which are incorporated in and form a part of this specification, illustrate embodiments of the invention and, together with the description, serve to explain the principles of the present invention.

Figure 1:
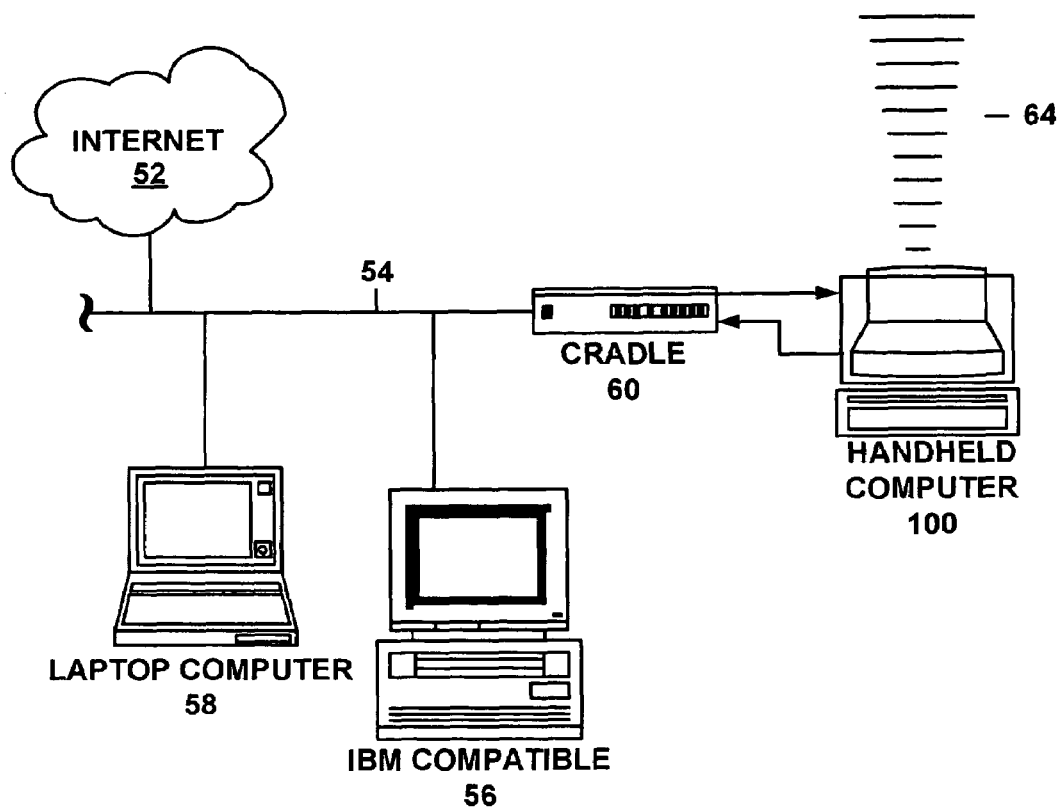
FIG. 1 illustrates a block diagram of a first exemplary network environment including a personal digital assistant coupled to other computer systems and the Internet via a cradle device in accordance with an embodiment of the present invention.

The drawings referred to in this description should not be understood as being drawn to scale except if specifically noted.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Although the description of the present invention will focus on an exemplary personal digital assistant or handheld computer system, the present invention can be practiced with other electronic systems or electronic devices capable of being networked (e.g., cellular phones, pagers, etc.).

Notation and Nomenclature

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "canceling", "assigning", "receiving", "forwarding", "dumping", "updating", "bypassing", "transmitting", "determining", "retrieving", "displaying", "identifying", "modifying", "processing", "preventing", "using", "sending", "adjusting" or the like, refer to the actions and processes of an electronic system or a computer system, or other electronic computing device/system such as a personal digital assistant (PDA), a cellular phone, a pager, etc. The computer system or similar electronic computing device manipulates and transforms data represented as physical, (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Exemplary Electronic System Environment

One of the common types of electronic systems which can be used in accordance with an embodiment of the present invention is referred to as a personal digital assistant, or commonly called a PDA. The personal digital assistant is a pocket sized electronic organizer with the capability to store telephone numbers, addresses, daily appointments, and software that keeps track of business or personal data such as expenses, etc. Furthermore, the personal digital assistant also has the ability to connect to a personal computer, enabling the two devices to exchange updated information. Additionally, the personal digital assistant can also be connected to a modem, enabling it to have electronic mail (e-mail) capabilities over the Internet along with other Internet capabilities. Moreover, an advanced personal digital assistant can have Internet capabilities over a wireless communication interface (e.g., radio interface). In particular, the personal digital assistant can be used to browse Web pages located on the Internet. The personal digital assistant can be coupled to a networking environment. It should be appreciated that embodiments of the present invention are well suited to operate within a wide variety of electronic systems (e.g., computer systems) which can be communicatively coupled to a networking environment, including cellular phones, pagers, etc.

FIG. 1 illustrates a first network system 51. The first network system 51 comprises a host computer system 56 which can either be a desktop computer system as shown, or, alternatively, can be a laptop computer system 58. Optionally, more than one host computer system 56 can be used within the first network system 51. Host computer systems 58 and 56 are shown connected to a communication bus 54, which in one embodiment can be a serial communication bus, but could be of any of a number of well known designs (e.g., a parallel bus, Ethernet Local Area Network (LAN), etc.). Optionally, bus 54 can provide communication with the Internet 52 using a number of well known protocols.

Importantly, bus 54 is also coupled to a cradle 60 for receiving and initiating communication with the exemplary personal digital assistant 100. Cradle 60 provides an electrical and mechanical communication interface between bus 54 (and any device coupled to bus 54) and the exemplary personal digital assistant 100 for two-way communications. The exemplary personal digital assistant 100 also contains a wireless infrared communication mechanism 64 for sending and receiving information from other devices. The exemplary personal digital assistant 100 can include both a wireless infrared communication mechanism and a signal (e.g., radio frequency) receiver/transmitter device.

Figure 2:
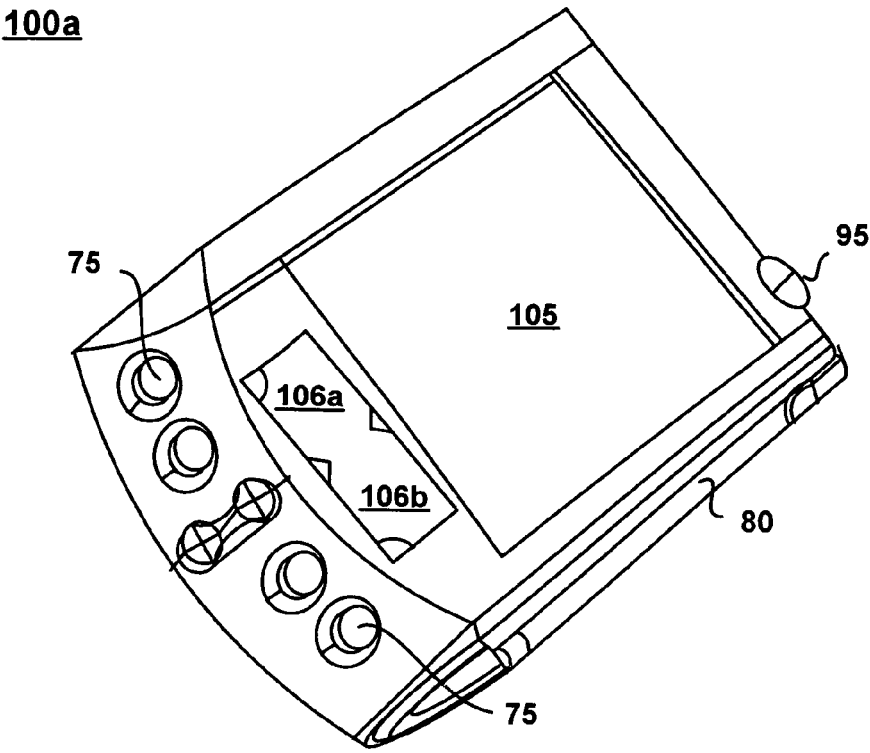
FIG. 2 illustrates a top side perspective view of a personal digital assistant that can be used in accordance with an embodiment of the present invention.

FIG. 2 is a perspective illustration of the top face 100a of one embodiment of the exemplary personal digital assistant or handheld computer system 100. The top face 100a has a display screen 105 surrounded by a bezel or cover. A removable stylus 80 is also shown. The display screen 105 is a touch screen able to register contact between the screen and the tip of the stylus 80. The stylus 80 can be of any material to make contact with the display screen 105. The top face 100a also has one or more dedicated and/or programmable buttons 75 for selecting information and causing the computer system to implement functions. The on/off button 95 is also shown. Moreover, a user is able to control specific functionality of the personal digital assistant 100 by using its plurality of buttons 75 (e.g., to invoke telephone/address data, calendar data, to-do-list data, memo pad data, etc.). Furthermore, the user can utilize the stylus 80 in conjunction with the display screen 105 in order to cause the personal digital assistant 100 to perform a multitude of different functions. One such function is the selecting of different functional operations of the personal digital assistant 100, which are accomplished by touching stylus 80 to specific areas of display screen 105. Another such function is the entering of data into the exemplary personal digital assistant 100.

FIG. 2 also illustrates a handwriting recognition pad or "digitizer" containing two regions 106a and 106b. Region 106a is for the drawing of alphabetic characters therein (and not for numeric characters) for automatic recognition, and region 106b is for the drawing of numeric characters therein (and not for alphabetic characters) for automatic recognition. The stylus 80 is used for stroking a character within one of the regions 106a and 106b. The stroke information is then fed to an internal processor for automatic character recognition. Once characters are recognized, they are typically displayed on the screen 105 for verification and/or modification.

Figure 3:
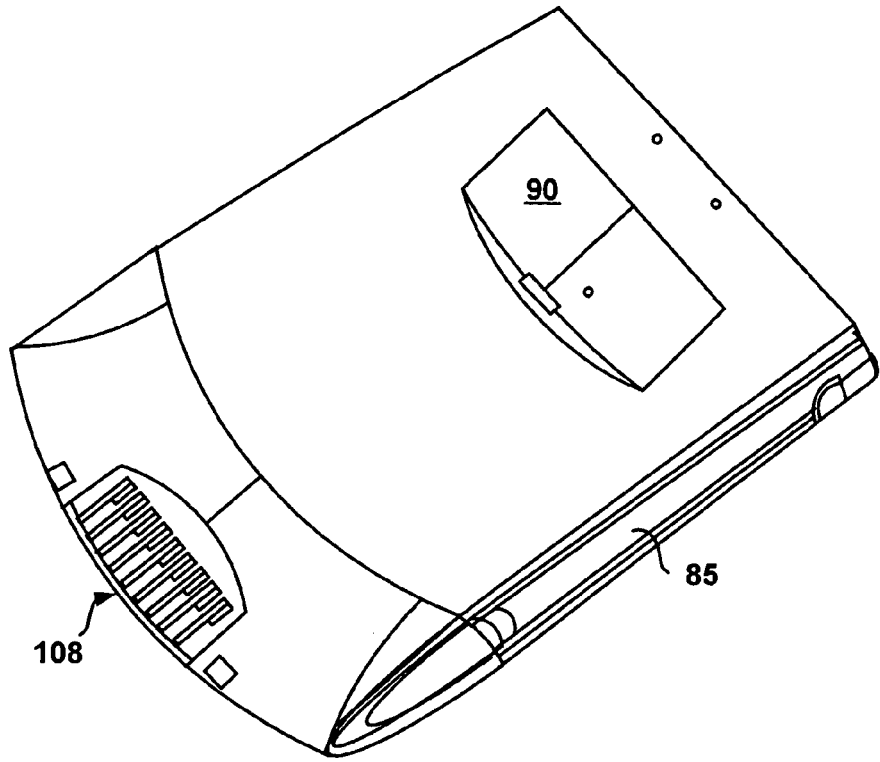
FIG. 3 illustrates a bottom side perspective view of the personal digital assistant of FIG. 2.

FIG. 3 illustrates the bottom side 100b of one embodiment of the exemplary personal digital assistant or palmtop computer system 100 that can be used in accordance with various embodiments of the present invention. An extendible antenna 85 is shown, and also a battery storage compartment door 90 is shown. The antenna 85 enables the exemplary personal digital assistant 100 to be communicatively coupled to a network environment, thereby enabling a user to communicate information with other electronic systems and electronic devices coupled to the network. A communication interface 180 is also shown. In one embodiment of the present invention, the communication interface 180 is a serial communication port, but could also alternatively be of any of a number of well-known communication standards and protocols (e.g., parallel, SCSI (small computer system interface), Firewire (IEEE 1394), Ethernet, etc.).

Figure 4:
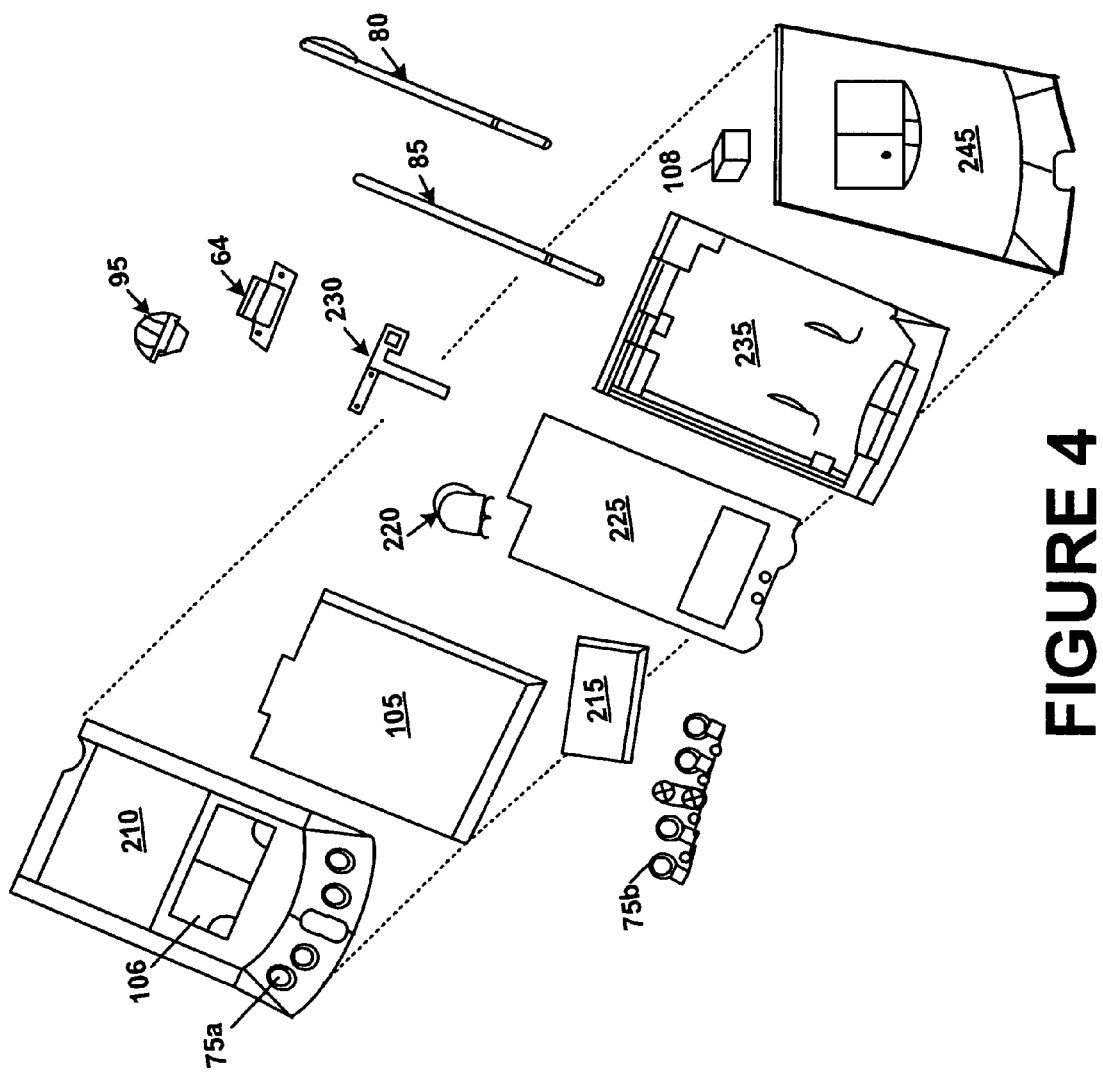
FIG. 4 illustrates an exploded view of the components of the personal digital assistant of FIG. 2.

FIG. 4 is an exploded view of the exemplary personal digital assistant 100. The exemplary personal digital assistant 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission display (FED), plasma, etc., for the flat panel display 105. A battery 215 provides electrical power. A contrast adjustment (potentiometer) 220 is also shown, as well as an on/off button 95. A flex circuit 230 is shown along with a personal computer (PC) board 225 containing electronics and logic (e.g., memory, communication bus, processor, etc.) for implementing computer system functionality. The digitizer pad is also included in PC board 225. A midframe 235 is shown along with stylus 80. Position-adjustable antenna 85 is shown.

Infrared communication mechanism 64 (e.g., an infrared emitter and detector device) is for sending and receiving information from other similarly equipped devices (see FIG. 1). A signal (e.g., radio frequency) receiver/transmitter device 108 is also shown. The receiver/transmitter device 108 is coupled to the antenna 85 and also coupled to communicate with the PC board 225. In one implementation, the Mobitex wireless communication system is used to provide two-way communication between the exemplary personal digital assistant 100 and other networked computers and/or the Internet.

Figure 5:
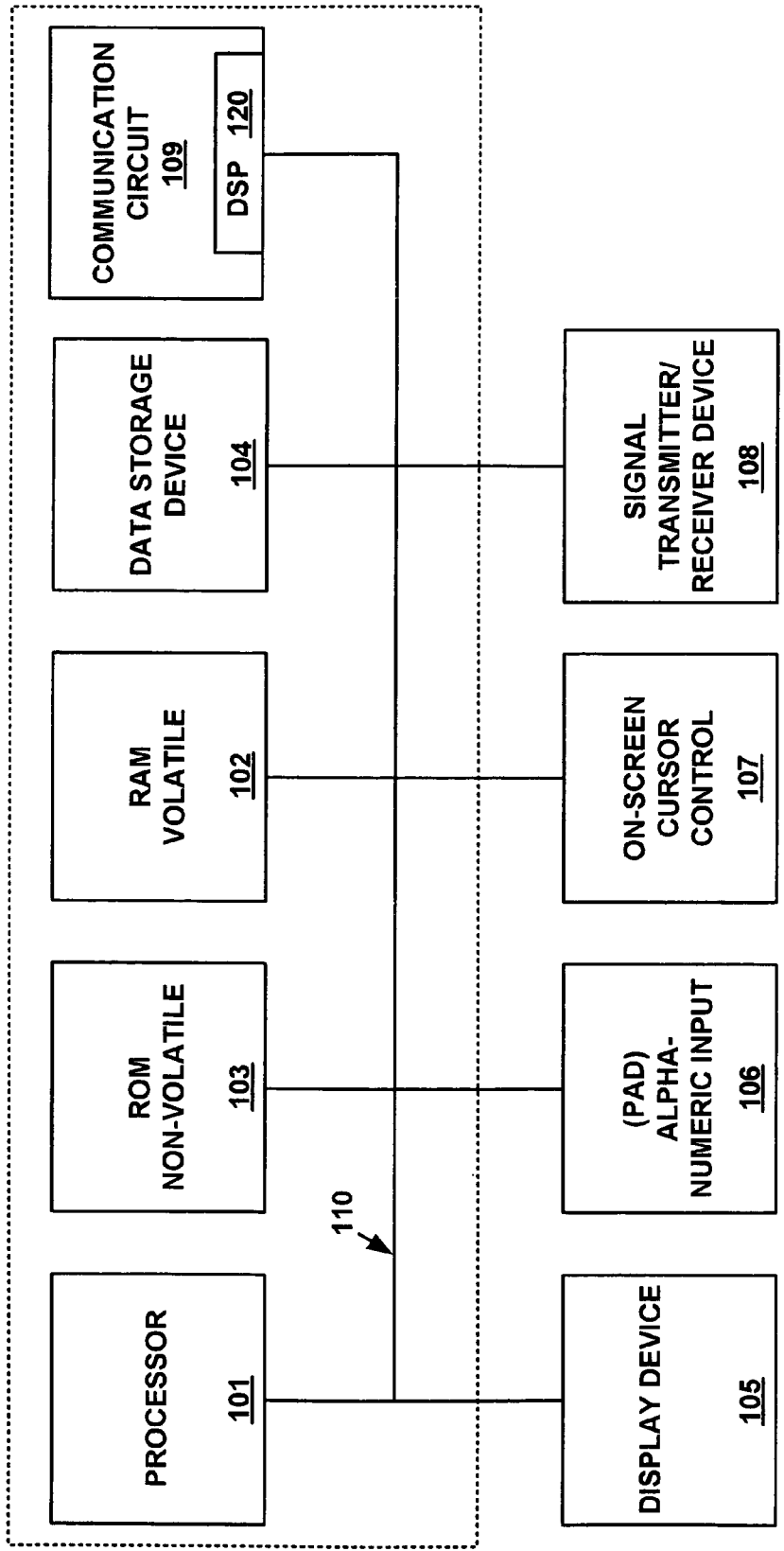
FIG. 5 illustrates is a logical circuit block diagram of the personal digital assistant in accordance with an embodiment of the present invention.

Referring now to FIG. 5, portions of the present electronic system are comprised of computer-readable and computer-executable instructions which reside, for example, in computer-readable media of an electronic system (e.g., personal digital assistant, computer system, and the like). FIG. 5 is a block diagram of exemplary interior components of an exemplary personal digital assistant 100 upon which embodiments of the present invention may be implemented. It is appreciated that the exemplary personal digital assistant 100 of FIG. 5 is only exemplary and that the present invention can operate within a number of different electronic systems including general purpose networked computer systems, embedded computer systems, and stand alone electronic systems such as a cellular telephone or a pager.

FIG. 5 illustrates circuitry of an exemplary electronic system or computer system 100 (such as the personal digital assistant), some of which can be implemented on PC board 225 (FIG. 5). Exemplary computer system 100 includes an address/data bus 110 for communicating information, a central processor 101 coupled to the bus 110 for processing information and instructions, a volatile memory 102 (e.g., random access memory, static RAM, dynamic RAM, etc.) coupled to the bus 110 for storing information and instructions for the central processor 101 and a non-volatile memory 103 (e.g., read only memory, programmable ROM, flash memory, EPROM, EEPROM, etc.) coupled to the bus 110 for storing static information and instructions for the processor 101. Exemplary computer system 100 also includes an optional data storage device 104 (e.g., memory card, hard drive, etc.) coupled with the bus 110 for storing information and instructions. Data storage device 104 can be removable. As described above, exemplary computer system 100 also includes an electronic display device 105 coupled to the bus 110 for displaying information to the computer user. In one embodiment, PC board 225 can include the processor 101, the bus 110, the ROM 103 and the RAM 102.

With reference still to FIG. 5, exemplary computer system 100 also includes a signal transmitter/receiver device 108 which is coupled to bus 110 for providing a communication link between computer system 100 and a network environment. As such, signal transmitter/receiver device 108 enables central processor unit 101 to communicate wirelessly with other electronic systems coupled to the network. It should be appreciated that within an embodiment of the present invention, signal transmitter/receiver device 108 is coupled to antenna 85 (FIG. 4) and provides the functionality to transmit and receive information over a wireless communication interface. It should be further appreciated that the present embodiment of signal transmitter/receiver device 108 is well-suited to be implemented in a wide variety of ways. For example, signal transmitter/receiver device 108 could be implemented as a modem.

In one embodiment, exemplary computer system 100 includes a communication circuit 109 coupled to bus 110. Communication circuit 109 includes an optional digital signal processor (DSP) 120 for processing data to be transmitted or data that are received via signal transmitter/receiver device 108. Alternatively, some or all of the functions performed by DSP 120 can be performed by processor 101.

Also included in exemplary computer system 100 of FIG. 5 is an optional alphanumeric input device 106 which in one implementation is a handwriting recognition pad ("digitizer") having regions 106a and 106b (FIG. 2), for instance. Alphanumeric input device 106 can communicate information and command selections to processor 101. Exemplary computer system 100 also includes an optional cursor control or directing device (on-screen cursor control 107) coupled to bus 110 for communicating user input information and command selections to processor 101. In one implementation, on-screen cursor control device 107 is a touch screen device incorporated with display device 105. On-screen cursor control device 107 is capable of registering a position on display device 105 where the stylus makes contact. The display device 105 utilized with exemplary computer system 100 may be a liquid crystal display device, a cathode ray tube (CRT), a field emission display device (also called a flat panel CRT) or other display device suitable for generating graphic images and alphanumeric characters recognizable to the user. In the preferred embodiment, display device 105 is a flat panel display.

Figure 6:
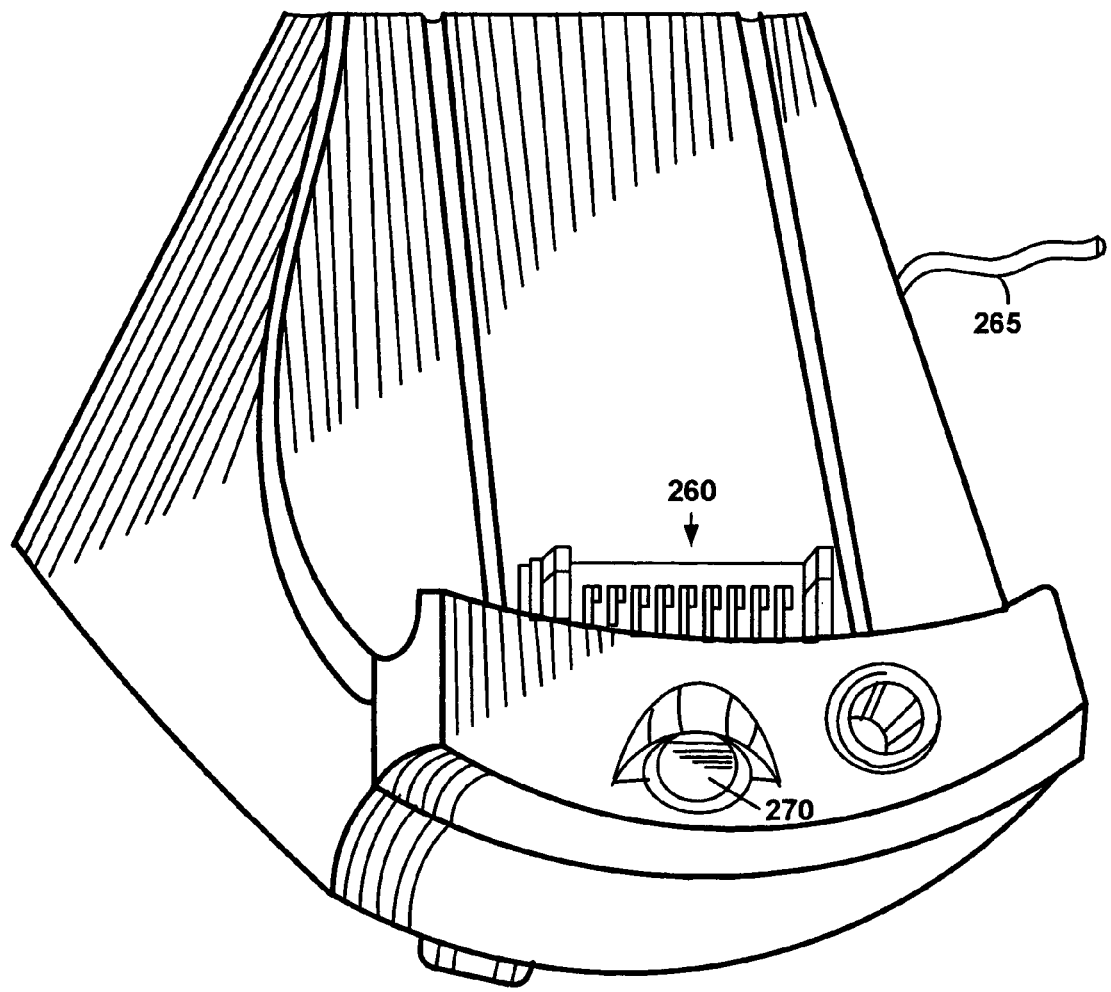
FIG. 6 illustrates a perspective view of the cradle device for connecting the personal digital assistant to other systems via a communication interface in accordance with an embodiment of the present invention.

FIG. 6 is a perspective illustration of an embodiment of the cradle 60 for receiving the exemplary personal digital assistant or handheld computer system 100. Cradle 60 includes a mechanical and electrical interface 260 for interfacing with communication interface 108 (FIG. 3) of the exemplary personal digital assistant 100 when the personal digital assistant 100 is slid into the cradle 60 in an upright position. Once inserted, button 270 can be pressed to initiate two-way communication between the personal digital assistant 100 and other computer systems or electronic devices coupled to serial communication 265.

Switching a Network Access Configuration Associated with a First Electronic System to a Second Electronic System Although the description of the present invention will focus on an exemplary personal digital assistant or handheld computer system, the present invention can be practiced with other electronic systems or electronic devices capable of being networked (e.g., cellular phones, pagers, etc.).

Figure 7:
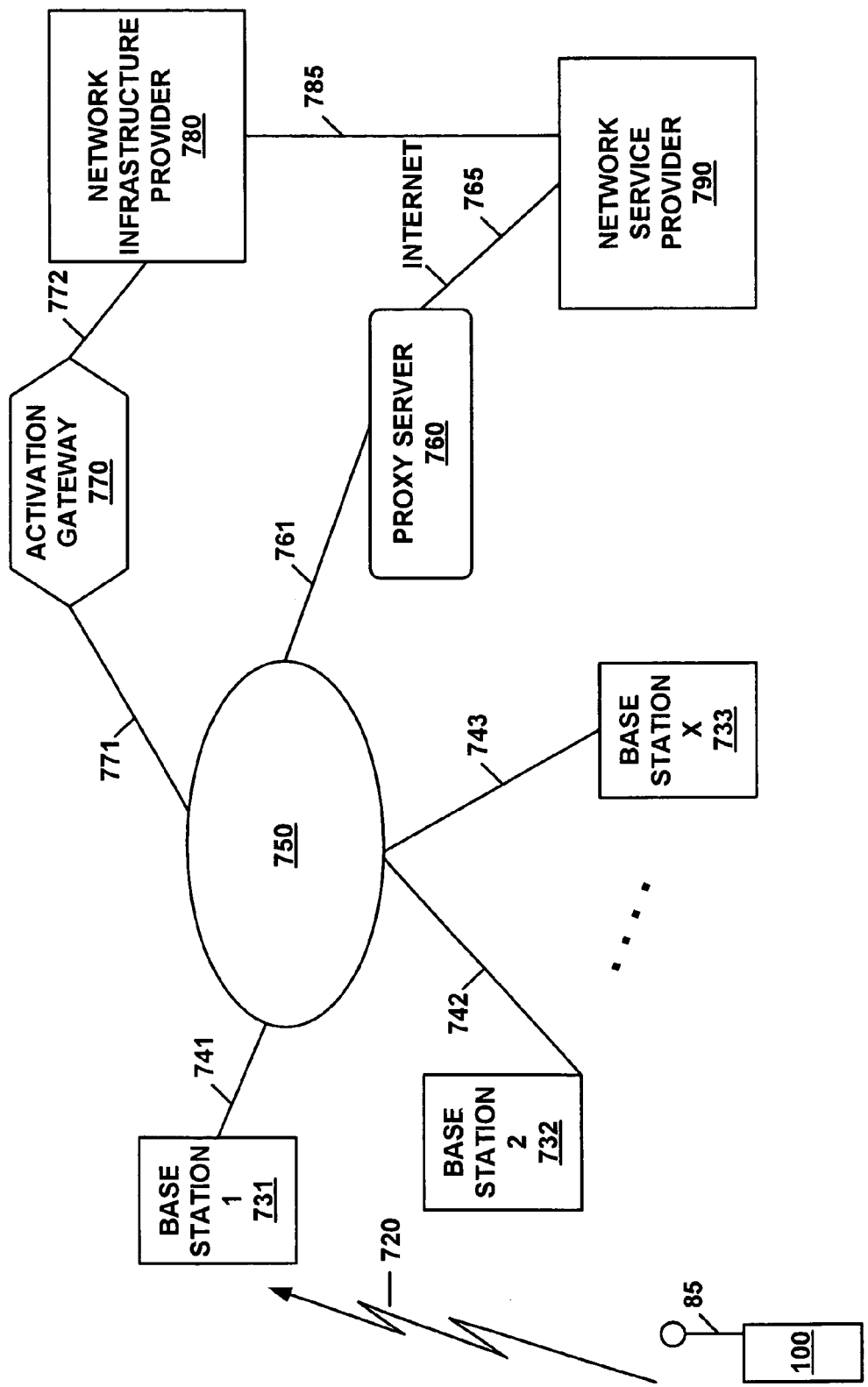
FIG. 7 illustrates a block diagram of a second exemplary network environment including a personal digital assistant in accordance with an embodiment of the present invention.

FIG. 7 illustrates a block diagram of a second exemplary network environment 700 in which an embodiment of the present invention can be practiced. In an embodiment of the present invention, the network environment 700 includes a first network 750. In an embodiment of the present invention, the first network 750 comprises a Mobitex network 750. It should be recognized that the first network 750 can be implemented in any other manner.

The Mobitex network 750 is a wireless network. The Mobitex network is a secure, reliable, two-way digital wireless packet switching network.

The Mobitex network 750 includes a plurality of base stations 731-733 for enabling an electronic system (e.g., the personal digital assistant 100) to access the Mobitex network 750. A base station1 731 is coupled to the Mobitex network 750 via communication connection 741. A base station2 732 is coupled to the Mobitex network 750 via communication connection 742. A base stationX 733 is coupled to the Mobitex network 750 via communication connection 743. In an embodiment of the present invention, the base stations 731–733 are configured to transmit and to receive data and information. The communication connections 741–743 can be implemented as a wireless connection, a wired connection (e.g., a telephone connection), or in any other appropriate manner.

The personal digital assistant 100 includes a radio frequency (RF) communication port (or radio interface) having an antenna 85. Moreover, the personal digital assistant 100 has the ability to transmit and receive data and information via the RF communication port. The personal digital assistant 100 utilizes the antenna 85 to couple to the base station1 731 via the connection 720. In an embodiment, the connection 720 is a wireless connection 720. Moreover, the wireless connection 720 is a RF wireless connection 720.

In an embodiment, a proxy server 760 is coupled to the Mobitex network 750 via communication connection 761. The proxy server 760 is coupled to the Internet 765. The proxy server 760 enables the personal digital assistant 100 to communicate with the Internet 765. It should be appreciated that within the present embodiment, one of the functions of proxy server 760 is to perform operations over the Internet 765 on behalf of the personal digital assistant 100. For example, proxy server 760 has a particular Internet address and acts as a proxy device for the personal digital assistant 100 over the Internet 765. It should be further appreciated that other embodiments for the network environment 700 may be utilized in accordance with the present invention.

In an embodiment, a network service provider 790 is coupled to the Internet 765. The network service provider 790 includes one or more databases for storing data for authorizing and tracking usage of the Mobitex network 750. Moreover, the network service provider 790 is coupled to a network infrastructure provider 790 via connection 785.

In an embodiment, an activation gateway 770 is coupled to the Mobitex network 750 via connection 771. The activation gateway 770 is coupled to the network infrastructure provider 780 via connection 772. The activation gateway 770 enables the personal digital assistant 100 to access the network infrastructure provider 780.

The network infrastructure provider 780 is coupled to the network service provider 790 via connection 785. The network infrastructure provider 780 is coupled to the activation gateway 770 via connection 772. In an embodiment, the network infrastructure provider 780 includes one or more databases for storing data for controlling and managing access to the Mobitex network 750.

To access the Mobitex network 750, the personal digital assistant 100, the activation gateway 770, and the proxy server 760 need a network identifier. In an embodiment, the network identifier comprises a Mobitex access number (MAN). The MAN is analogous to a phone number on a telephone network.

According to an embodiment of the present invention, when a first personal digital assistant becomes inoperable, a second personal digital assistant 100 is swapped for the first personal digital assistant. The first personal digital assistant is made inoperable due to any reason. For example, the first personal digital assistant may become lost or stolen. Moreover, the first personal digital assistant may malfunction.

Rather than activating the second personal digital assistant 100 with a new network access configuration so that a user can access the Mobitex network 750 with the second personal digital assistant 100, a network access configuration associated with the first personal digital assistant is re-associated with the second personal digital assistant 100. The network access configuration includes the network identifier (e.g., the Mobitex access number). In an embodiment, the network access configuration further includes, for example, network user account data, network user privileges data, or network user profile data. Thus, the user experiences a seamless transition from the first personal digital assistant to the second personal digital assistant 100 when accessing the Mobitex network 750.

In an embodiment of the present invention, an application is loaded to the second personal digital assistant 100. Upon invoking the application, the application automatically switches the network access configuration associated with the first personal digital assistant to the second personal digital assistant 100 via the RF communication port of the second personal digital assistant 100. During a first phase, the network infrastructure provider 780 updates its one or more databases such that the second personal digital assistant 100 is able to access the Mobitex network 750 using the network access configuration (previously associated with the first personal digital assistant). During a second phase, the network service provider 790 updates its one or more databases such that the second personal digital assistant 100 is able to access the Mobitex network 750 using the network access configuration (previously associated with the first personal digital assistant). At the conclusion of the second phase, the second personal digital assistant 100 can access the Mobitex network 750 using the network access configuration (previously associated with the first personal digital assistant). However, the first personal digital assistant is denied access to the Mobitex network 750 if the first personal digital assistant 100 attempts to access the Mobitex network 750 using the network access configuration (previously associated with the first personal digital assistant).

Figure 8:
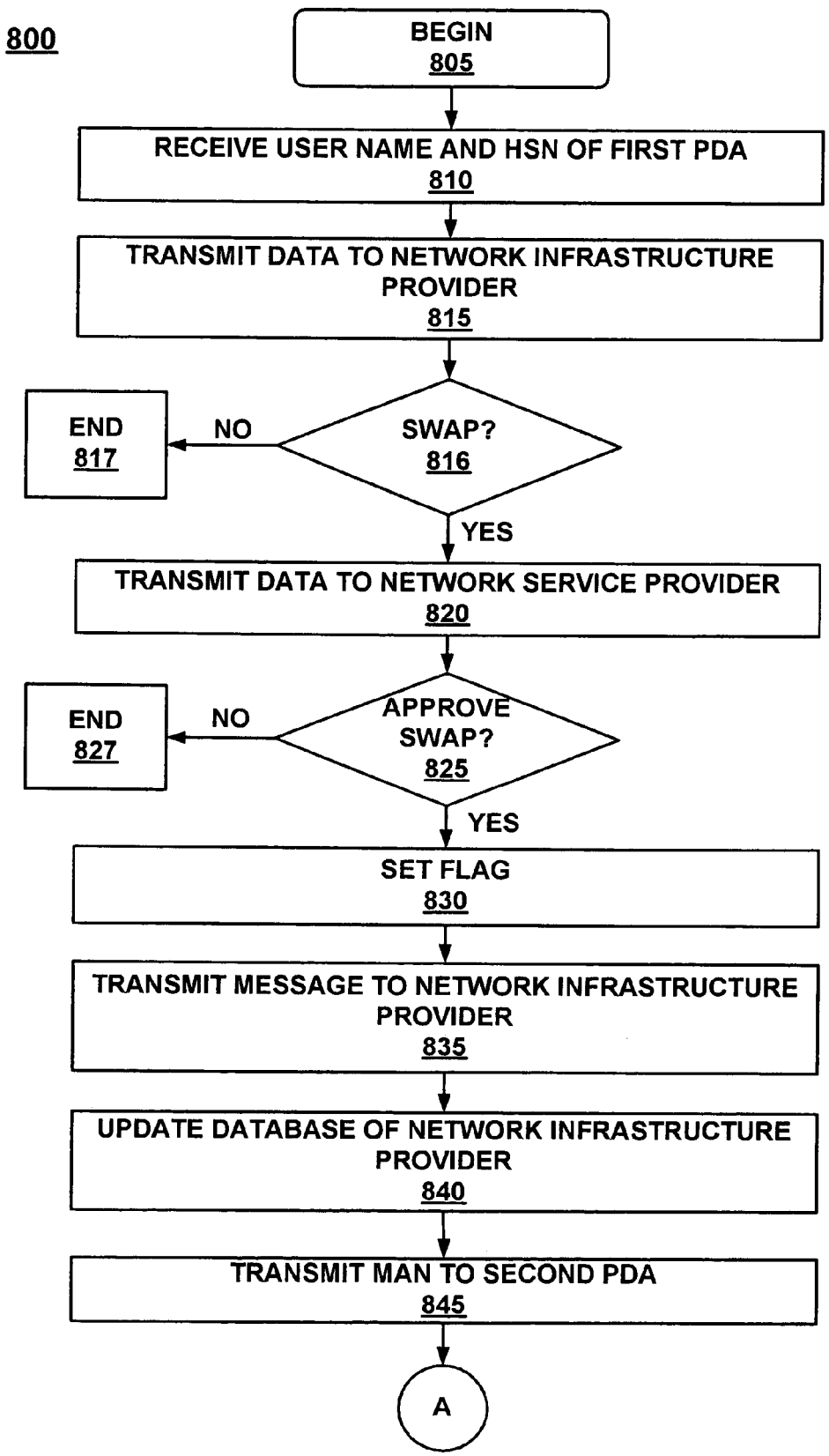
FIG. 8 illustrates a flow chart diagram of steps performed in accordance with an embodiment of the present invention for switching a network access configuration.

FIG. 8 illustrates a flow chart diagram of steps performed in accordance with an embodiment of the present invention for switching a network access configuration. Reference will be made to FIG. 7. In particular, FIG. 8 illustrates the first phase of the method of switching the network access configuration associated with the first personal digital assistant to the second personal digital assistant 100.

At step 805, an application is loaded to the second personal digital assistant 100. The application is configured to automatically switch the network access configuration associated with the first personal digital assistant to the second personal digital assistant 100. In an embodiment, a repair facility configures the second personal digital assistant 100 before sending the second personal digital assistant 100 to the user (that previously utilized the first personal digital assistant)

At step 810, the application is invoked using the second personal digital assistant 100. The application prompts the repair facility to input data. In one embodiment, the repair facility inputs the user name and the hardware serial number associated with the first personal digital assistant, whereas the hardware serial number (HSN) uniquely identifies each personal digital assistant. In one embodiment, the user provides the user name and the hardware serial number associated with the first personal digital assistant to the repair facility. In another embodiment, the user provides his/her name. The repair facility utilizes one or more databases of the network service provider 790 to obtain the user name and the hardware serial number associated with the first personal digital assistant. The hardware serial number comprises a Mobitex serial number and a Mobitex serial number extension. In still another embodiment, the repair facility inputs the user name and the Mobitex serial number associated with the first personal digital assistant (rather than the hardware serial number associated with the first personal digital assistant).

At step 815, data is transmitted to the network infrastructure provider 780 via the antenna 85. In one embodiment, the user name, the hardware serial number associated with the first personal digital assistant, and the hardware serial number associated with the second personal digital assistant 100 are transmitted to the network infrastructure provider 780. In addition, a request for re-associating the network access configuration associated with the first personal digital assistant to the second personal digital assistant 100 is transmitted to the network infrastructure provider 780. In one embodiment, the second personal digital assistant 100 utilizes the Mobitex access number associated with the activation gateway 770 to transmit the data to the activation gateway 770 via base station1 731. The activation gateway 770 transmits the data to the network infrastructure provider 780 via connection 772.

At step 816, the network infrastructure provider 780 determines whether the data includes a request for re-associating the network access configuration associated with the first personal digital assistant to the second personal digital assistant 100. At step 817, the present method ends if there is no request for re-associating the network access configuration.

Otherwise, at step 820, the network infrastructure provider 780 transmits data to the network service provider 790 via connection 785. In an embodiment, the user name, the hardware serial number associated with the first personal digital assistant, and the hardware serial number associated with the second personal digital assistant 100 are transmitted to the network service provider 790. The network infrastructure provider 780 stores and manages the Mobitex access numbers. In addition, the Mobitex access number associated with the first personal digital number is transmitted to the network service provider 790. Moreover, the network infrastructure provider 780 transmits a request for approving the re-association of the network access configuration.

At step 825 of FIG. 8, the network service provider 790 determines whether to approve the request for re-associating the network access configuration associated with the first personal digital assistant to the second personal digital assistant 100. The network service provider 790 examines its one or more databases to determine whether the user is authorized to access the Mobitex network. At step 827, the present method ends if the network service provider 790 does not approve the request for re-associating the network access configuration associated with the first personal digital assistant to the second personal digital assistant 100.

Otherwise, at step 830, the network service provider 790 sets a flag to indicate that the re-association of the network access configuration has been approved.

At step 835, the network service provider 790 transmits data to the network infrastructure provider 780. In an embodiment, a response approving the re-association of the network access configuration is transmitted.

At step 840, the network infrastructure provider 780 updates its one or more databases such that the second personal digital assistant 100 is able to access the Mobitex network 750 using the network access configuration associated with the first personal digital assistant. In an embodiment, the network infrastructure provider 780 invalidates the hardware serial number associated with the first personal digital assistant. Moreover, the network infrastructure provider 780 associates the network access configuration (previously associated with the first personal digital assistant) with the second personal digital assistant 100. In particular, the Mobitex access number of the first personal digital assistant is associated with the hardware serial number of the second personal digital assistant 100.

At step 845 of FIG. 8, the network infrastructure provider 780 transmits the Mobitex access number of the first personal digital assistant to the second personal digital assistant 100 via activation gateway 770 and base station1 731. In an embodiment, the Mobitex access number of the first personal digital assistant is stored in a memory device of the second personal digital assistant 100. In an embodiment, the memory device comprises a flash memory device.

The first phase concludes at the end of step 845. The first personal digital assistant can no longer access the Mobitex network 750. In an embodiment, the second phase (of the method of switching the network access configuration associated with the first personal digital assistant to the second personal digital assistant 100) begins after a particular time interval has expired. In one embodiment, the particular time interval is one hour.

Figure 9:
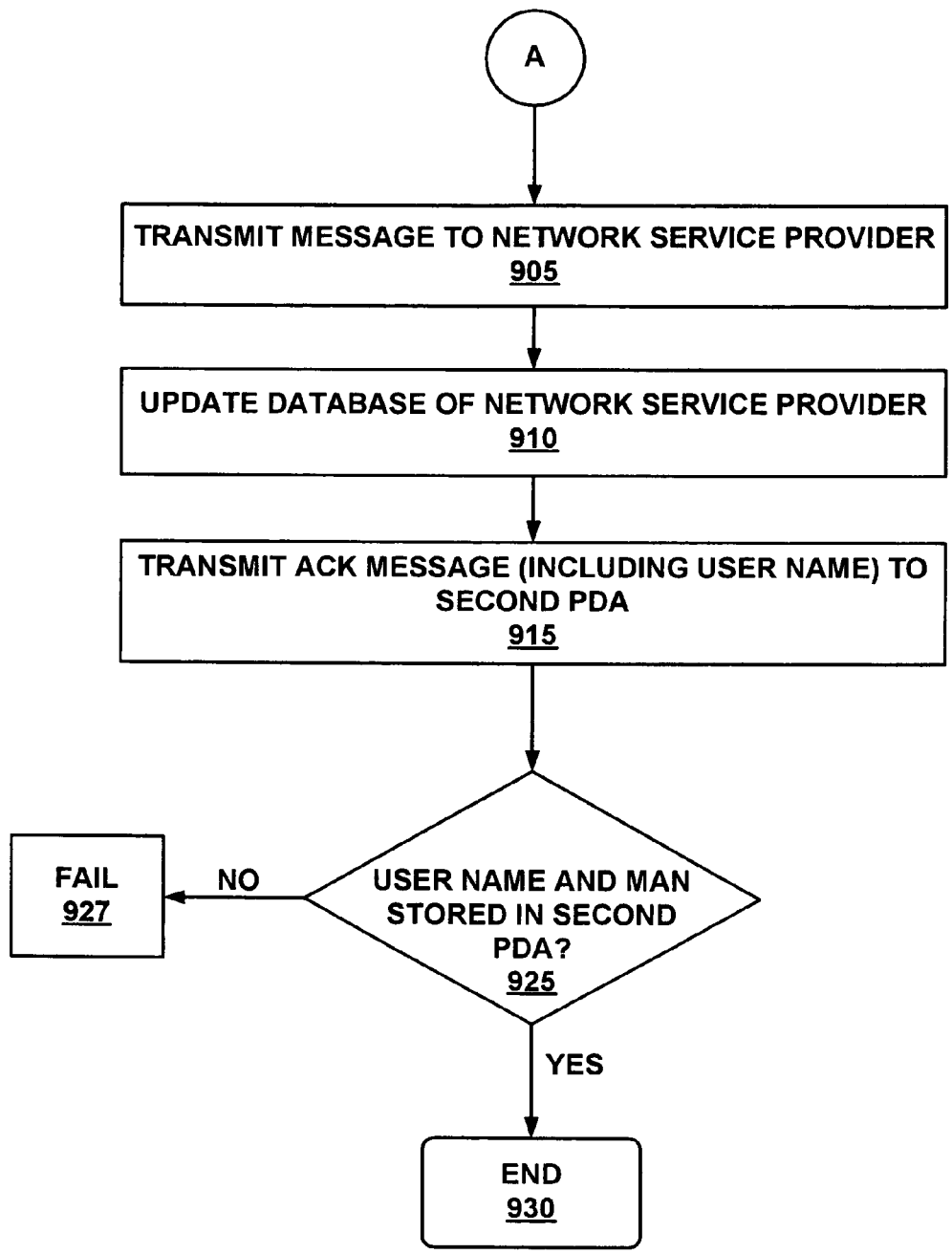
FIG. 9 illustrates a flow chart diagram of steps performed in accordance with an embodiment of the present invention for switching a network access configuration.

FIG. 9 illustrates a flow chart diagram of steps performed in accordance with an embodiment of the present invention for switching a network access configuration. Reference will be made to FIG. 7. In particular, FIG. 9 illustrates the second phase of the method of switching the network access configuration associated with the first personal digital assistant to the second personal digital assistant 100.

At step 905, the second personal digital assistant 100 transmits data to the network service provider 790 via the antenna 85. In an embodiment of the present invention, a request to complete the re-association of the network access configuration is transmitted. In an embodiment, the second personal digital assistant 100 utilizes the Mobitex access number associated with the proxy server 760 to transmit the data to the proxy server 760 via base station1 731. The proxy server 760 transmits the data to the network service provider 790 via the Internet 765. In an embodiment, the data is implemented as a HyperText Transmission Protocol Secure (HTTPS) message.

At step 910, the network service provider 790 updates its one or more databases such that the second personal digital assistant 100 is able to access the Mobitex network 750 using the network access configuration associated with the first personal digital assistant. In an embodiment, the network service provider 790 invalidates the hardware serial number associated with the first personal digital assistant. Moreover, the network service provider 790 associates the network access configuration (previously associated with the first personal digital assistant) with the second personal digital assistant 100. In particular, the Mobitex access number of the first personal digital assistant is associated with the hardware serial number of the second personal digital assistant 100. Moreover, the user name of the first personal digital assistant is associated with the second personal digital assistant 100.

At step 915, the network service provider 790 transmits an acknowledgment (ACK) message to the second personal digital assistant 100 via the proxy server 760 and the base station1 731, whereas the acknowledgment message indicates that the re-association of the network access configuration has been successful. In an embodiment of the present invention, the acknowledgment message includes the user name associated with the first personal digital assistant. In an embodiment, the acknowledgment message is implemented as a HyperText Transmission Protocol Secure (HTTPS) message. In an embodiment, the user name is stored in a memory device of the second personal digital assistant 100. According to an embodiment of the present invention, the memory device comprises a flash memory device.

At step 925, the second personal digital assistant 100 determines whether it has stored the user name and the Mobitex access number of the first personal digital assistant in the memory device of the second personal digital assistant 100. At step 927, the method of the present invention has failed since the user name or Mobitex access number is not stored in the second personal digital assistant.

Otherwise, at step 930, the method of the present invention ends. At the conclusion of the second phase, the second personal digital assistant 100 can access the Mobitex network 750 using the network access configuration (previously associated with the first personal digital assistant). However, the first personal digital assistant is denied access to the Mobitex network 750 if the first personal digital assistant 100 attempts to access the Mobitex network 750 using the network access configuration (previously associated with the first personal digital assistant).

In one embodiment, the repair facility deletes the application for switching the network access configuration before sending the second personal digital assistant 100 to the user.

Figure 10:
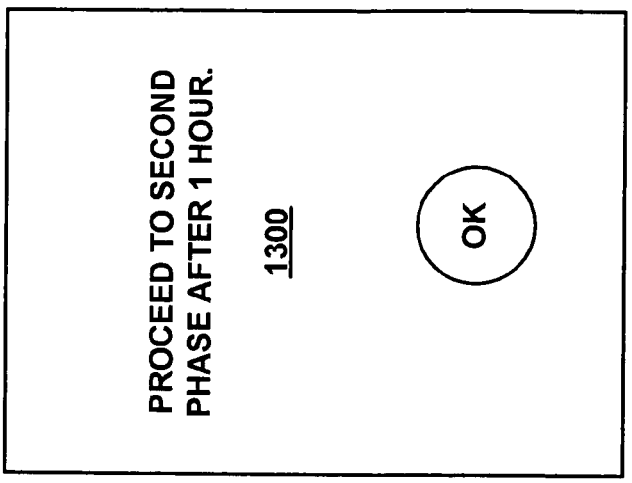
FIG. 10 illustrates a plurality of exemplary windows displaying information on a personal digital assistant in accordance with an embodiment of the present invention.
Figure 10:
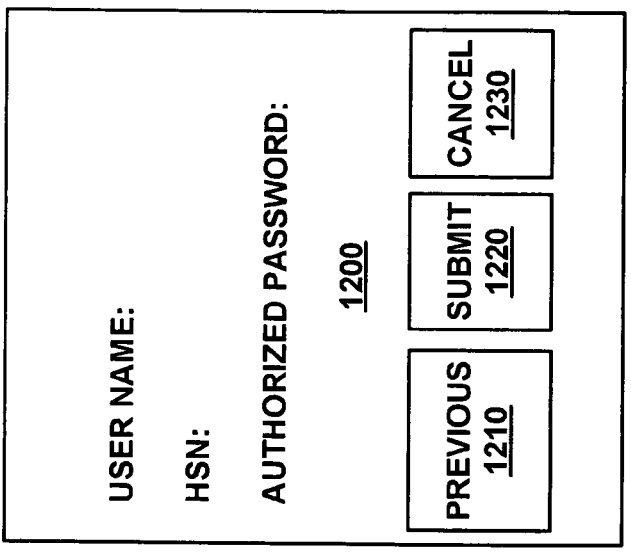
Figure 10:
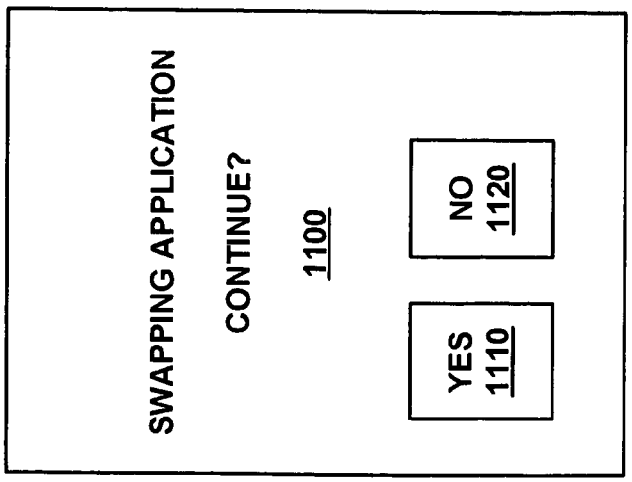

FIG. 10 illustrates a plurality of exemplary windows displaying information on a personal digital assistant in accordance with an embodiment of the present invention. In an embodiment, the repair facility interfaces with the exemplary windows. The first window 1100 appears on the second personal digital assistant 100 upon invoking the application for switching the network access configuration associated with the first personal digital assistant to the second personal digital assistant 100. By selecting NO 1120, the application ends without configuring the second personal digital assistant 100.

By selecting YES 1110, the second window 1200 appears on the second personal digital assistant 100. The repair facility can input the user name and the hardware serial number (HSN) associated with the first personal digital assistant. In one embodiment, the repair facility enters an authorized password to prevent unauthorized use of the application. By selecting PREVIOUS 1210, the first window 1100 appears on the second personal digital assistant 100. By selecting CANCEL 1230, the application ends without configuring the second personal digital assistant 100. By selecting SUBMIT 1220, the application configures the second personal digital assistant 100 as described above.

The third window 1300 appears at the end of the first phase. The third window 1300 alerts the repair facility to proceed with the second phase after the particular time interval has expired. It should be recognized that the windows 1100, 1200, and 1300 are merely exemplary and that other configurations can be implemented in accordance with the present invention. In one embodiment, a selection is made by positioning a stylus on the selection on the window. Alternatively, the selection can be made in any other appropriate manner.

Those skilled in the art will recognize that the present invention may be incorporated as computer instructions stored as computer program code on a computer-readable medium such as a magnetic disk, CD-ROM, and other media common in the art or that may yet be developed.

Finally, one of the embodiments of the present invention is an application, namely, a set of instructions (e.g., program code) which may, for example, be resident in the random access memory of an electronic system (e.g., computer system, personal digital assistant or handheld computer system, etc.). Until required by the computer system, the set of instructions may be stored in another computer memory, for example, in a hard drive, or in a removable memory such as an optical disk (for eventual use in a CD-ROM) or floppy disk (for eventual use in a floppy disk drive), or downloaded via the Internet or other computer network. Thus, the present invention may be implemented as a computer program product for use in a computer system (e.g., personal digital assistant). In addition, although the various methods of the present invention described above are conveniently implemented in a computer system selectively activated or reconfigured by software, one of ordinary skill in the art would also recognize that such methods of the present invention may be carried out in hardware, firmware, or in a more specialized apparatus constructed to perform the required methods of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of transferring association of network access configuration data from a first mobile device to a second mobile device, said method comprising:

transmitting from said second mobile device to a network a request message representing a request to transfer association of said network access configuration data from said first mobile device to said second mobile device; and in response to a completion message from said network, determining at said second mobile device whether network access data is stored in a memory location accessible by said second mobile device, wherein said completion message indicates completion of transferring association of said network access configuration data from said first mobile device to said second mobile device.

2. The method as recited in claim 1 wherein said request message comprises a user name associated with said first mobile device and hardware serial number associated with said first mobile device.

3. The method as recited in claim 1 wherein said network access data comprises a user name associated with said first mobile device and a network identifier associated with said first mobile device.

4. The method as recited in claim 1 wherein said network access configuration data comprises network user account data.

5. The method as recited in claim 1 wherein said network access configuration data comprises network user privileges data.

6. The method as recited in claim 1 wherein said network access configuration data comprises network user profile data.

7. The method as recited in claim 1 wherein said network access configuration data comprises a network identifier associated with said first mobile device.

8. A computer-readable medium comprising computer-executable instructions stored therein for performing a method of transferring association of network access configuration data from a first mobile device to a second mobile device, said method comprising:

transmitting from said second mobile device to a network a request message representing a request to transfer association of said network access configuration data from said first mobile device to said second mobile device; and in response to a completion message from said network, determining at said second mobile device whether network access data is stored in a memory location accessible by said second mobile device, wherein said completion message indicates completion of transferring association of said network access configuration data from said first mobile device to said second mobile device.

9. The computer-readable medium as recited in claim 8 wherein said request message comprises a user name associated with said first mobile device and hardware serial number associated with said first mobile device.

10. The computer-readable medium as recited in claim 8 wherein said network access data comprises a user name associated with said first mobile device and a network identifier associated with said first mobile device.

11. The computer-readable medium as recited in claim 8 wherein said network access configuration data comprises network user account data.

12. The computer-readable medium as recited in claim 8 wherein said network access configuration data comprises network user privileges data.

13. The computer-readable medium as recited in claim 8 wherein said network access configuration data comprises network user profile data.

14. The computer-readable medium as recited in claim 8 wherein said network access configuration data comprises a network identifier associated with said first mobile device.

15. A mobile device comprising:
a display;
a first module that transmits to a network a request message representing a request to transfer association of network access configuration data from a second mobile device to said mobile device; and a second module that determines whether network access data is stored in a memory location accessible by said mobile device in response to a completion message from said network, wherein said completion message indicates completion of transferring association of said network access configuration data from said second mobile device to said mobile device.

16. The mobile device as recited in claim 15 wherein said request message comprises a user name associated with said second mobile device and hardware serial number associated with said second mobile device.

17. The mobile device as recited in claim 15 wherein said network access data comprises a user name associated with said second mobile device and a network identifier associated with said second mobile device.

18. The mobile device as recited in claim 15 wherein said network access configuration data comprises network user account data.

19. The mobile device as recited in claim 15 wherein said network access configuration data comprises network user privileges data.

20. The mobile device as recited in claim 15 wherein said network access configuration data comprises network user profile data.

21. The mobile device as recited in claim 15 wherein said network access configuration data comprises a network identifier associated with said first mobile device.

\* \* \* \* \*